United States Patent
Kajikawa (10) Patent No.: US 10,457,334 B2
(45) Date of Patent: Oct. 29, 2019

(54) STEERING SUPPORT STRUCTURE (71) Applicant: TOYOTA JIDOSHA KABUSHIKI KAISHA, Toyota-shi, Aichi-ken (JP)

(72) Inventor: Kouta Kajikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/028,708

(22) Filed: Jul. 6, 2018

(65) Prior Publication Data
US 2019/0016395 A1 Jan. 17, 2019

(30) Foreign Application Priority Data
Jul. 12, 2017 (JP) .................................. 2017-135933

(51) Int. Cl.
B62D 25/14 (2006.01)
B62D 1/187 (2006.01)
B62D 1/16 (2006.01)

(52) U.S. Cl.
CPC ............. B62D 25/145 (2013.01); B62D 1/16 (2013.01); B62D 1/187 (2013.01)

(58) Field of Classification Search
CPC ......... B62D 25/145; B62D 1/16; B62D 1/187
USPC .............................................. 296/193.02, 70
See application file for complete search history.

(56) References Cited

U.S. PATENT DOCUMENTS

| 7,921,564 B2 * | 4/2011 | Baudart | B62D 25/142 29/428 |
|---|---|---|---|
| 8,919,855 B2 * | 12/2014 | Ruiz Rincon | B62D 25/145 296/193.02 |
| 9,340,236 B2 * | 5/2016 | Kong | B62D 1/16 |
| 2017/0349218 A1 | 12/2017 | Nishimura et al. | |

FOREIGN PATENT DOCUMENTS

JP 2016-120866 A 7/2016

* cited by examiner

Primary Examiner — Joseph D. Pape
(74) Attorney, Agent, or Firm — Oliff PLC (57) ABSTRACT

The instrument panel reinforcement pipe extends in a width direction of a vehicle, and is formed in a circular tubular shape to support a steering column placed in a front-and-rear direction of the vehicle. The cowl-to brace extends in the front-and-rear direction of the vehicle, has a front end fixed on a cowl panel placed in a farther front side of the vehicle than the instrument panel reinforcement pipe, and includes a joint portion to be joined with the instrument panel reinforcement pipe, between the front end and a rear end. The floor brace extends in an up-and-down direction of the vehicle, and has a lower end fixed on a floor tunnel and an upper end fixed to the rear end of the cowl-to brace. The joint portion of the cowl-to brace is formed in a ring shape to be fitted and inserted into the instrument panel reinforcement pipe.

4 Claims, 12 Drawing Sheets

STEERING SUPPORT STRUCTURE

CROSS REFERENCE TO RELATED APPLICATION

The disclosure of Japanese Patent Application No. 2017-135933 filed on Jul. 12, 2017, including the specification, claims, drawings, and abstract, is incorporated herein by reference in its entirety.

TECHNICAL FIELD

The present disclosure relates to a steering support structure of an automobile.

BACKGROUND

As a steering support structure of an automobile, an instrument panel reinforcement pipe (herein after also referred to as "instrument panel R/F pipe"), a floor brace, and a cowl-to brace are used. These members are also collectively referred to as an "instrument panel R/F structure," and form a part of a skeleton structure of the automobile.

The instrument panel R/F pipe is a circular tubular pipe member, extends along a width direction of a vehicle, and respective ends thereof are fixed on front pillars. The floor brace is a support member which primarily supports the instrument panel R/F pipe in an up-and-down direction of the vehicle, and has a lower end fixed on a floor tunnel, and an upper part connected to the instrument panel R/F pipe. The cowl-to brace is a support member which primarily supports the instrument panel R/F pipe in a front-and-rear direction of the vehicle, and has a front end fixed on a cowl panel placed at a farther front side of the vehicle than the instrument panel R/F pipe, and a rear part connected to the instrument panel R/F pipe.

Figure 10:
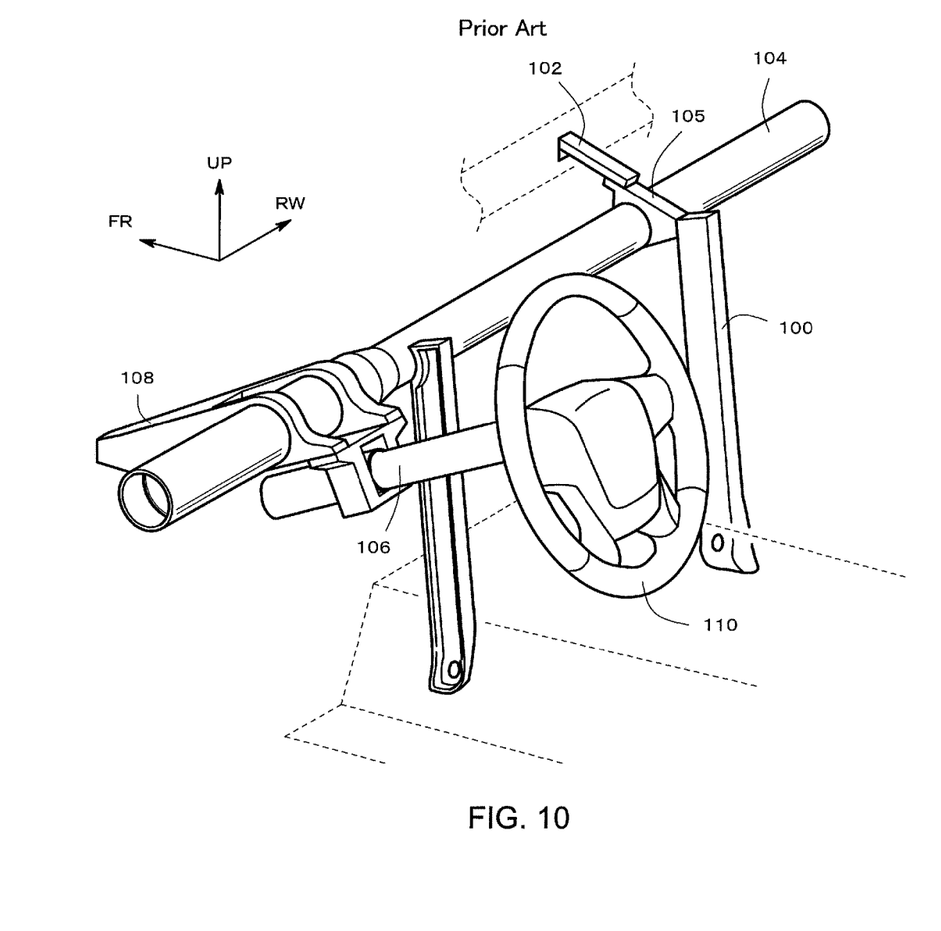
FIG. 10 is a perspective diagram exemplifying a steering support structure of the related art.

For example, as exemplified in FIG. 10, in JP 2016-120866 A, attachment positions of a floor brace 100 and a cowl-to brace 102 onto the instrument panel R/F pipe 104 are coincident in the width direction of the vehicle (RW direction in FIG. 10). In FIG. 10, an example vehicle is shown in which the steering wheel is on the left side. More specifically, as exemplified in FIG. 10, a bracket 105 is joined by welding or the like to a part of the instrument panel R/F pipe 104 at its circumference. In addition, a rear end of the cowl-to brace 102 is fixed to the front end of the bracket 105. Further, an upper end of the floor brace 100 is fixed to a rear end of the bracket 105.

Moreover, a steering column 106 is placed to incline from an upper side toward a lower side of the vehicle in a side view from the rear of the vehicle toward the front of the vehicle. In this state, the steering column 106 is supported by the instrument panel R/F pipe 104 via a support member such as a steering support 108.

By attaching the floor brace 100 and the cowl-to brace 102 onto the same location on the instrument panel R/F pipe 104, it becomes possible to suppress up-and-down wobbles (staggering) of the steering wheel 110 with superior balance.

For example, when a vehicle body falls into a large hole on a road surface or moves out of such a large hole, or when the vehicle rapidly passes a projected step, an up-and-down load is applied on the steering wheel 110, which is a heavy-weight object.

Figure 11:
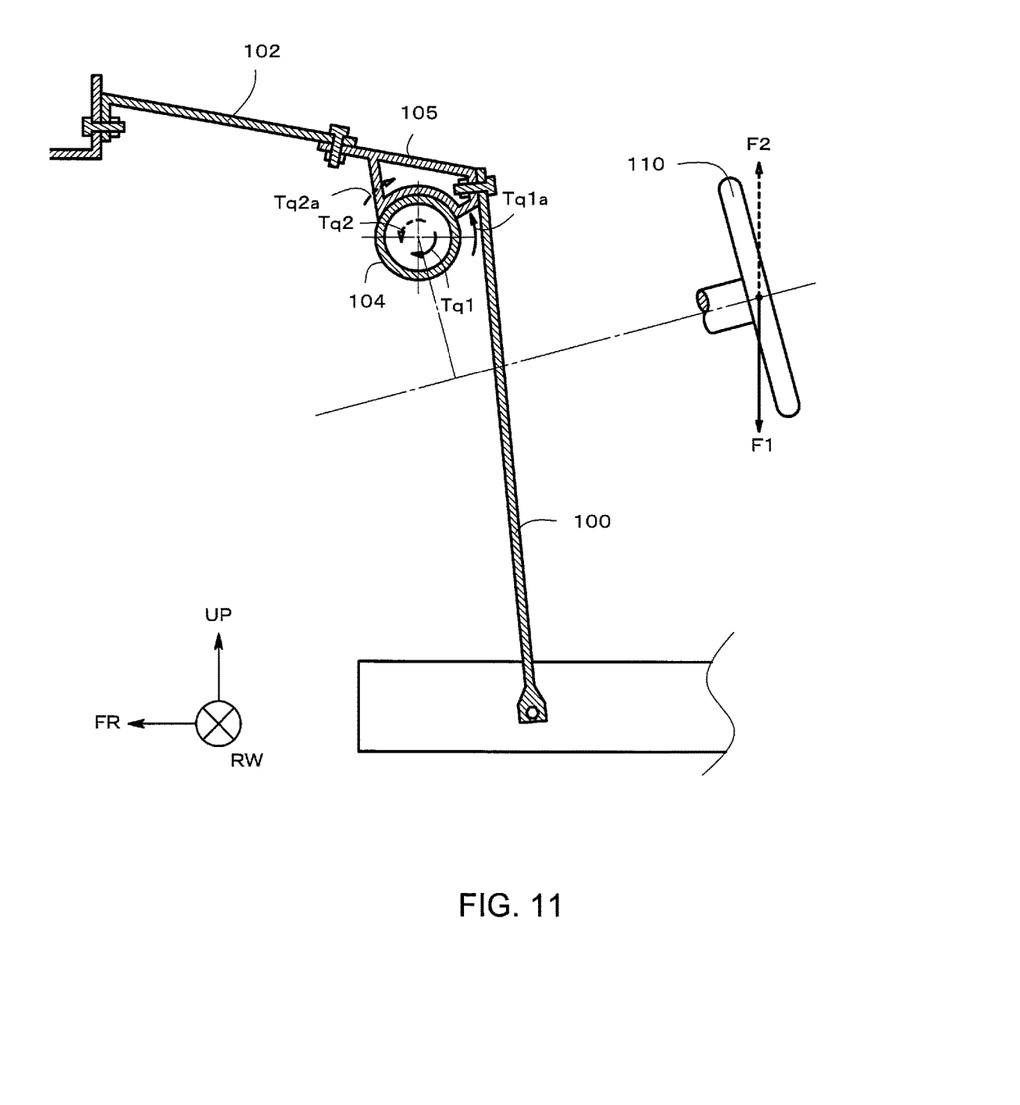
FIG. 11 is a diagram for explaining a behavior of the steering support structure of the related art when a downward load is input from a steering wheel.

In this case, as shown in FIG. 11, when a downward load F1 is applied to the steering wheel 110, for example, a torsion moment Tq1 (torque) is applied to the instrument panel R/F pipe 104 in a clockwise direction from its center axis. The torsion moment Tq1 acts to compress the floor brace 100 toward a lower side of the vehicle. With this process, a stress in the opposite direction is caused at the floor brace 100, and, as a result, a torsion stress Tq1$a$ in an opposite direction from the torsion moment Tq1 is generated in the instrument panel R/F pipe 104.

As shown by a broken line, when an upward load F2 is applied to the steering wheel 110, a torsion moment Tq2 (torque) is applied to the instrument panel R/F pipe 104 in a counterclockwise direction from its center axis. The torsion moment Tq2 acts to compress the cowl-to brace 102 toward a front direction of the vehicle. With this process, a stress in an opposite direction is generated in the cowl-to brace 102, and, as a result, a torsion stress Tq2$a$ in an opposite direction from the torsion moment Tq2 is generated in the instrument panel R/F pipe 104.

By setting to the same position the mounting positions of the floor brace 100 which primarily suppresses the torsion in the clockwise direction of the instrument panel R/F pipe 104 and the cowl-to brace 102 which primarily suppresses the torsion in the counterclockwise direction of the instrument panel R/F pipe 104, an amount of torsion of the instrument panel R/F pipe 104 is balanced between the time when a downward load is imposed on the steering wheel 110 and the time when an upward load is imposed on the steering wheel 110. Because the amount of torsion of the instrument panel R/F pipe 104 is reflected in an amount of displacement of the steering wheel 110, the amount of displacement of the steering wheel 110 can be balanced between the time of application of the upward load and the time of application of the downward load.

Figure 12:
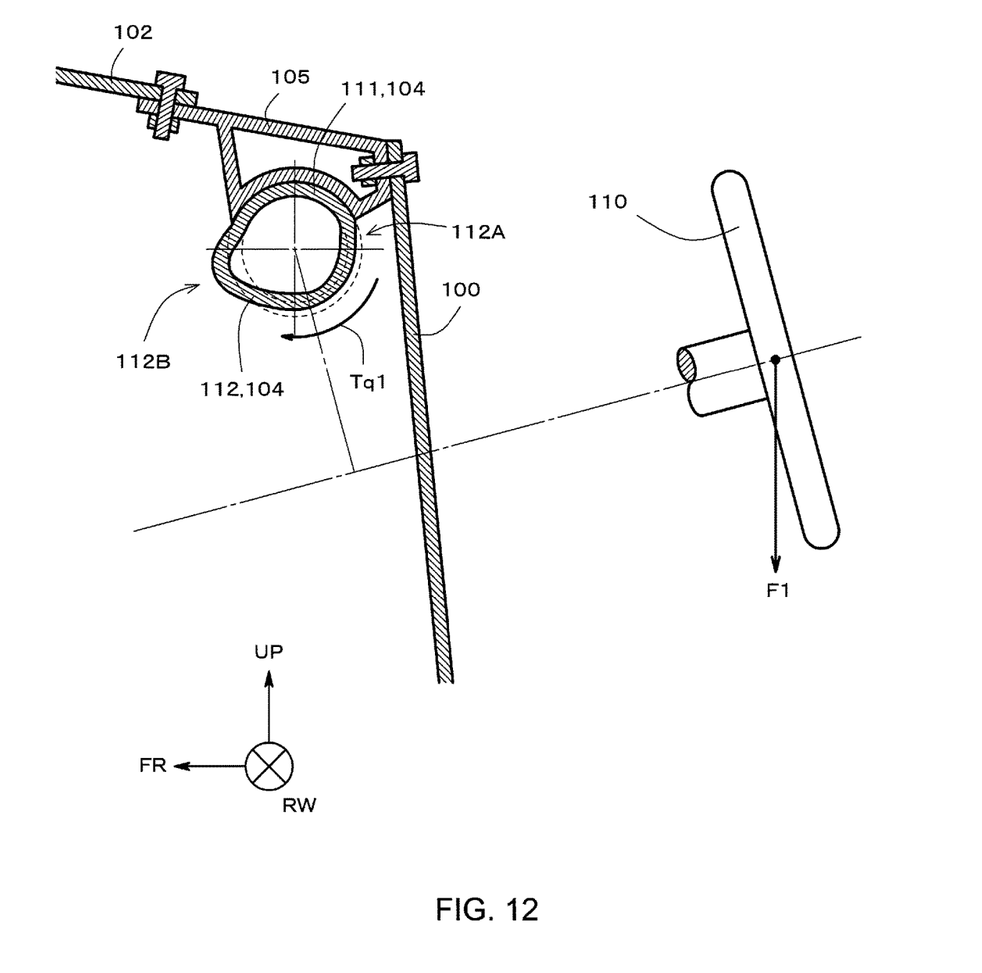
FIG. 12 is a diagram for explaining a cross-sectional shape collapse of an instrument panel R/F pipe.

When the floor brace and the cowl-to brace are joined only to a part of the instrument panel R/F pipe around its circumference, there is a possibility of cross-sectional shape collapse (cross-sectional deformation) of the instrument panel R/F pipe. For example, as shown in FIG. 12, when a downward load F1 is applied to the steering wheel 110, a load pulling in the clockwise direction is applied to one end 112A of a non-joined portion 112 of the instrument panel R/F pipe 104. Similarly, a load to gather the material in the clockwise direction is imposed on the other end 112B of the non-joined portion of the instrument panel R/F pipe 104.

As a result, the non-joined portion 112 which is thinner compared to the joined portion 111 is deformed, and the cross-sectional shape collapse occurs in which the cross-sectional shape of the instrument panel R/F pipe 104 is deformed from the true circle shown by the broken line. As a result of the cross-sectional shape collapse, the rigidity of the instrument panel R/F pipe 104 may be reduced such as, for example, a reduction of the rigidity in the up-and-down direction in the example structure of FIG. 12.

An advantage of the present disclosure lies in provision of a steering support structure which can further suppress, compared to the related art, the cross-sectional shape collapse of the instrument panel R/F pipe when loads in the up-and-down direction are applied to the steering wheel.

SUMMARY

According to one aspect of the present disclosure, there is provided a steering support structure. The structure comprises an instrument panel reinforcement pipe, a cowl-to brace, and a floor brace. The instrument panel reinforcement pipe extends in a width direction of a vehicle, and is formed in a circular tubular shape to support a steering column placed in a front-and-rear direction of the vehicle. The cowl-to brace extends in the front-and-rear direction of the vehicle, has a front end fixed on a cowl panel placed in a farther front side of the vehicle than the instrument panel reinforcement pipe, and comprises a joint portion to be joined with the instrument panel reinforcement pipe between the front end and a rear end. The floor brace extends in an up-and-down direction of the vehicle, and has a lower end fixed on a floor tunnel and an upper end fixed to the rear end of the cowl-to brace. The joint portion of the cowl-to brace is formed in a ring shape to be fitted and inserted into the instrument panel reinforcement pipe, and is joined over the entire circumference of the instrument panel reinforcement pipe.

According to the above-described structure, because the joint portion of the cowl-to brace is joined to the instrument panel reinforcement pipe over the entire circumference, when a torsion moment is applied to the instrument panel reinforcement pipe upon input of a load in the up-and-down direction from the steering wheel, deformation is prevented over the entire circumference of the instrument panel reinforcement pipe at the joint location (joined location) with the joint portion. As a result, the cross-sectional shape collapse of the instrument panel reinforcement pipe is suppressed.

According to another aspect of the present disclosure, there is provided a steering support structure comprising an instrument panel reinforcement pipe, a cowl-to brace, and a floor brace. The instrument panel reinforcement pipe extends in a width direction of a vehicle, and is formed in a circular tubular shape to support a steering column placed in a front-and-rear direction of the vehicle. The floor brace extends in an up-and-down direction of the vehicle, has a lower end fixed on a floor tunnel, and comprises a joint portion to be joined with the instrument panel reinforcement pipe, between the lower end and an upper end. The cowl-to brace extends in the up-and-down direction of the vehicle, and has a front end fixed on a cowl panel placed in a farther front side of the vehicle than the instrument panel reinforcement pipe and a rear end fixed to the upper end of the floor brace. The joint portion of the floor brace is formed in a ring shape to be fitted and inserted into the instrument panel reinforcement pipe, and is joined over the entire circumference of the instrument panel reinforcement pipe.

According to the above-described structure, because the joint portion of the floor brace is joined to the instrument panel reinforcement pipe over the entire circumference, when a torsion moment is applied to the instrument panel reinforcement pipe due to input of a load in the up-and-down direction from the steering wheel, the deformation is prevented over the entire circumference of the instrument panel reinforcement pipe at a joint location (joined location) with the joint portion. As a result, the cross-sectional shape collapse of the instrument panel reinforcement pipe can be suppressed.

According to another aspect of the present disclosure, the floor brace may comprise a D-seat floor brace placed on the side of a driver seat. In this case, an upper end of the D-seat floor brace may be fixed to the rear end of the cowl-to brace.

According to the above-described structure, the cowl-to brace and the floor brace are placed at the side of the driver seat in which the steering column is placed. With such a configuration, a distance between the steering column and the cowl-to brace and the floor brace is reduced, and, consequently, an amount of torsion of the instrument panel reinforcement pipe can be reduced.

ADVANTAGEOUS EFFECTS OF INVENTION

According to the present disclosure, the cross-sectional shape collapse of the instrument panel reinforcement pipe can be suppressed to a larger degree compared to the related art, when a load in the up-and-down direction is applied to the steering wheel.

BRIEF DESCRIPTION OF DRAWINGS

Embodiment(s) of the present disclosure will be described by reference to the following figures, wherein.

DESCRIPTION OF EMBODIMENTS

Figure 1:
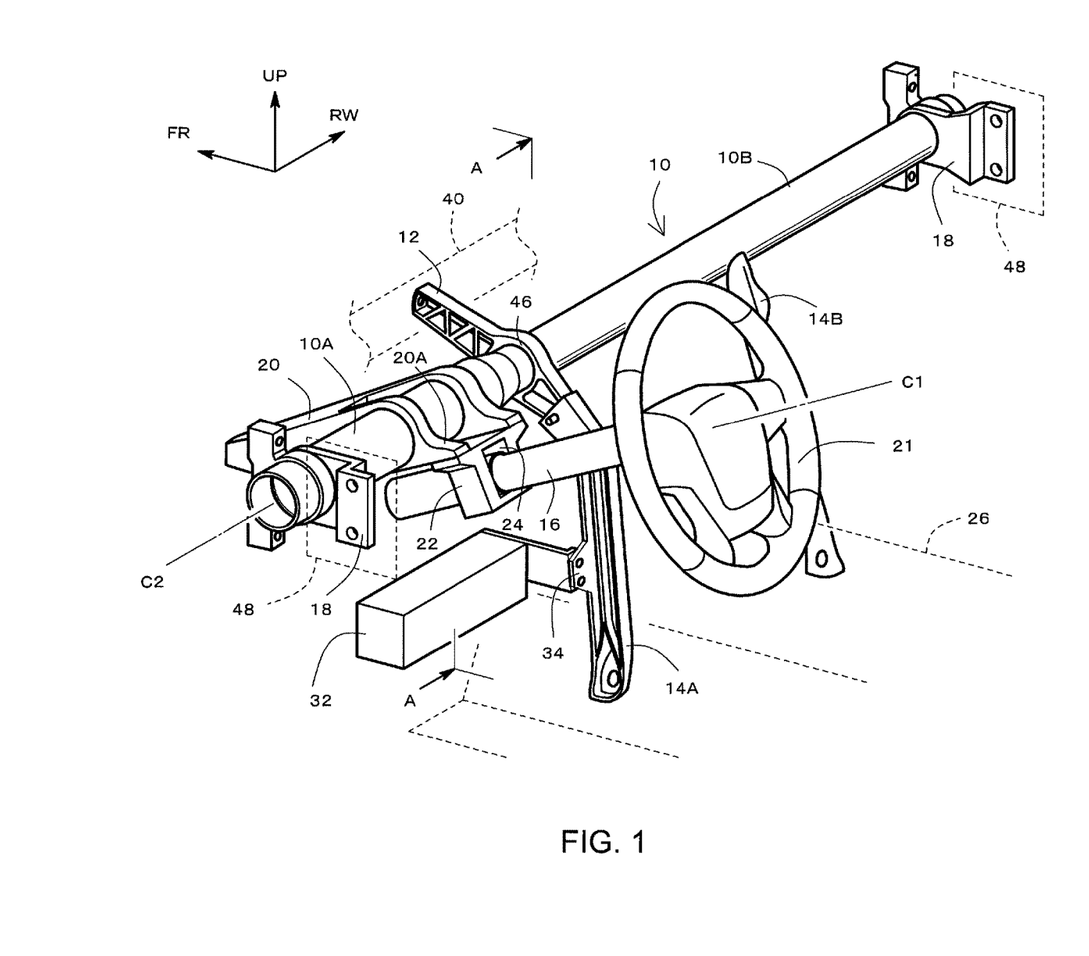
FIG. 1 is a perspective diagram exemplifying a steering support structure according to an embodiment of the present disclosure.

FIG. 1 exemplifies a steering support structure according to an embodiment of the present disclosure. In FIGS. 1~12, a front-and-rear direction of a vehicle is shown with an axis represented by FR, a width direction of the vehicle is shown with an axis represented by RW, and a vertical direction is shown by an axis represented by UP. FR is an abbreviation for "front," and the front-and-rear direction axis FR has a front direction of the vehicle as a positive direction. RW is an abbreviation for "right width," and the width direction axis RW has a right width direction as a positive direction. Further, the height axis UP has the upward direction as a positive direction.

As shown in FIG. 1, the FR axis, the RW axis, and the UP axis are orthogonal to each other. In the following, in the description of the steering support structure of the present embodiment, the descriptions are given with reference to these three axes. For example, a "front end" refers to an end of an arbitrary member on the side of a positive direction of the FR axis, and a "rear end" refers to an end of an arbitrary member on the side of a negative direction of the FR axis. Similarly, an "inner width side" refers to a relative inner side in the width direction of the vehicle along the RW axis, and an "outer width side" refers to a relative outer side in the width direction of the vehicle along the RW axis. An "upper side" refers to a relative side in the positive direction of the UP axis, and a "lower side" refers to a relative side in the negative direction of the UP axis.

FIG. 1 exemplifies a steering support structure when a front side of the vehicle is viewed from a driver seat of a left-steering-wheel automobile. An instrument panel which separates a steering wheel 21 and the steering support structure is omitted in the drawings. The steering support structure forms a part of a skeleton member of the vehicle, and comprises an instrument panel R/F pipe 10, a cowl-to brace 12, and a floor brace 14.

Figure 2:
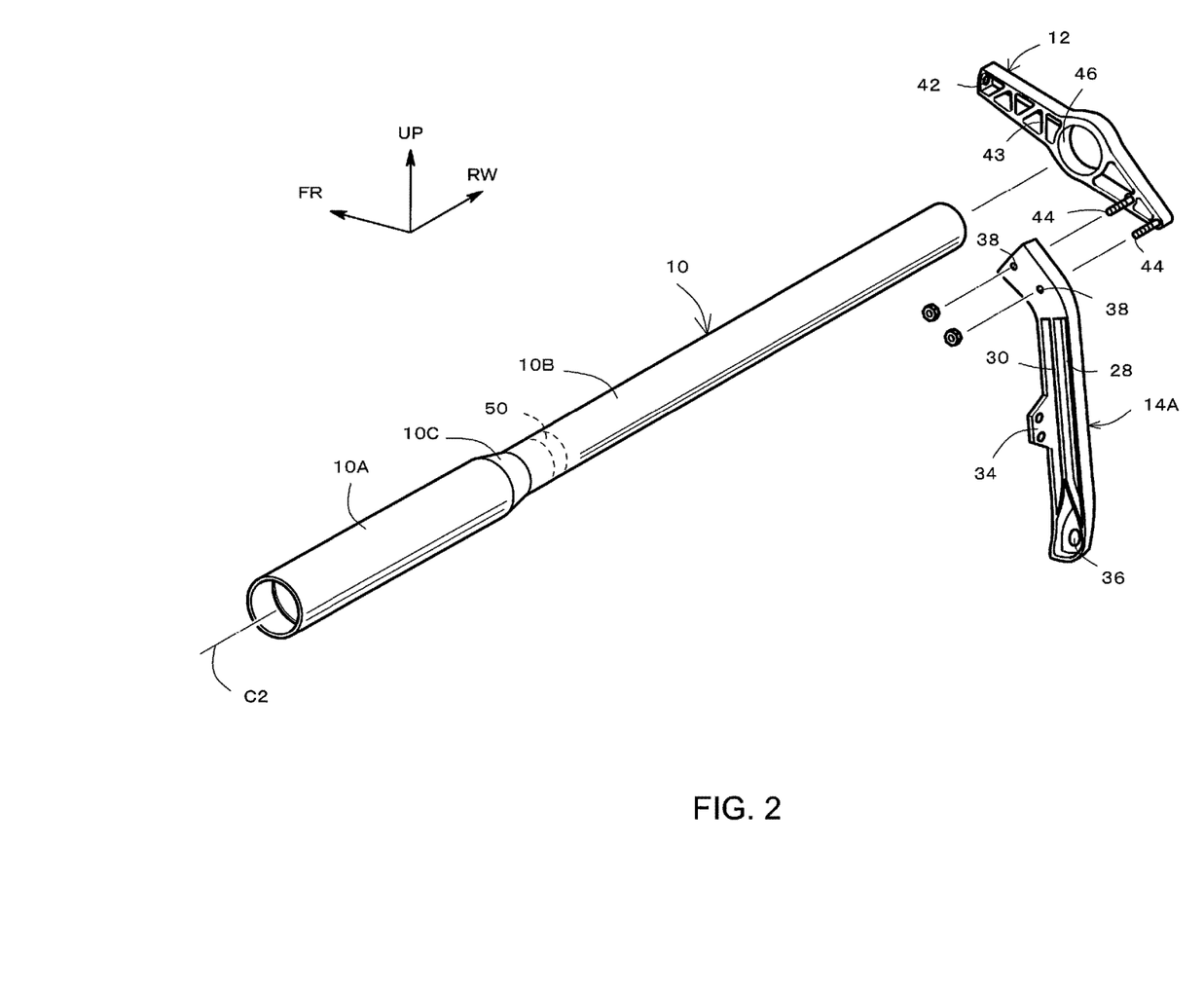
FIG. 2 is an explanatory diagram when a cowl-to brace and a floor brace are assembled to an instrument panel R/F pipe.

The instrument panel R/F pipe 10 is a circular tubular member extending in the vehicle width direction. The instrument panel R/F pipe 10 is a pipe member, and is formed from, for example, a so-called rolled plate pipe in which an aluminum plate is bent and processed. In addition, as described particularly in FIG. 2 in detail, the instrument panel R/F pipe 10 comprises a D-seat pipe 10A and a P-seat pipe 10B. The D-seat pipe 10A is a circular tubular member which is placed on the side of the driver seat, and the P-seat pipe 10B is a circular tubular member placed on the side of the passenger seat. The D-seat pipe 10A is formed to have a thicker diameter than that of the P-seat pipe 10B, so that the D-seat pipe 10A has an increased rigidity. As shown in FIG. 2, a compressed diameter part 10C is formed at an end of the D-seat pipe 10A on the side of the P-seat pipe, and, for example, the P-seat pipe 10B is inserted into the compressed diameter part 10C and the pipes are joined by full-circumference welding or the like.

On the instrument panel R/F pipe 10, a steering column 16, the cowl-to brace 12, the floor brace 14, a side bracket 18, and an audio device, a front air bag, or the like (not shown) are attached.

The steering column 16 is placed in the front-and-rear direction of the vehicle. More specifically, the steering column 16 is placed to incline from an upper part of the vehicle toward a lower part, from a rear side of the vehicle toward the front side. The steering column 16 is supported on the instrument panel R/F pipe 10 via a steering support 20 and a steering bracket 22. The steering wheel 21 is attached on a rear end of the steering column 16.

The steering column 16 is supported on the instrument panel R/F pipe 10 in a manner that a center axis C1 thereof is distanced from a center axis C2 of the instrument panel R/F pipe 10. For example, a ring-shaped fit-and-insertion hole is formed on the steering support 20, and the steering support 20 is fitted and inserted (or plugged) into the instrument panel R/F pipe 10 through the fit-and-insertion hole. After the steering support 20 is fitted and inserted into a predetermined position of the D-seat pipe 10A of the instrument panel R/F pipe 10 and joined, the steering bracket 22 is fixed on a flange 20A of the steering support 20 using a fastening member such as a bolt and a nut. A support hole 24 into which the steering column 16 is inserted is formed on the steering bracket 22, and the steering column 16 is fixed in the support hole 24.

In this process, the center axis C2 of the instrument panel R/F pipe 10 extending in the width direction and the center axis C1 of the steering column 16 extending in the front-and-rear direction are orthogonal to each other in the plan view. Further, when a load in the up-and-down-direction is applied to the steering wheel 21 provided on the rear end of the steering column 16, a torsion moment is caused around the center axis C2 of the instrument panel R/F pipe 10.

The floor brace 14 is a reinforcement member extending in the up-and-down direction of the vehicle. More specifically, the floor brace 14 is placed to incline from the rear side of the vehicle toward the front side of the vehicle, from the lower side of the vehicle toward the upper side.

The floor brace 14 comprises a D-seat floor brace 14A provided on the side of the driver seat, and a P-seat floor brace 14B provided on the side of the passenger seat. Lower ends of the D-seat floor brace 14A and the P-seat floor brace 14B are both supported and fixed on a floor tunnel 26.

Moreover, in the steering support structure according to the present embodiment, the D-seat floor brace 14A is fixed on the cowl-to brace 12. As will be described below, by connecting the D-seat floor brace 14A which is relatively closer to the steering column 16 on the instrument panel R/F pipe 10 along with the cowl-to brace 12, it becomes possible to reduce an amount of torsion of the instrument panel R/F pipe 10.

As exemplified in FIG. 2, the D-seat floor brace 14A has a V-shape (or a ˆshape) structure in the side view, and is bent from the lower end, so that the upper end extends along the direction of extension of the cowl-to brace 12. Further, the D-seat floor brace 14A has a lightened part 28 which is thinned in the vehicle width direction, and a rib 30 is formed on the lightened part 28 along a longitudinal direction thereof. In addition, a flange 34 for supporting and fixing a knee air bag 32 (refer to FIG. 1) is formed at an intermediate portion of the lightened part 28 in the longitudinal direction.

A support hole 36 is formed at a lower end of the D-seat floor brace 14A, for inserting a fastening member such as a nut and fixing the D-seat floor brace 14A on the floor tunnel 26. In addition, a support hole 38 is formed at an upper end of the D-seat floor brace 14A, for fixing the D-seat floor brace 14A on the cowl-to brace 12. In order to prevent relative rotation of the D-seat floor brace 14A with respect to the cowl-to brace 12 during vehicle vibration or the like, a plurality of the support holes 38 may be formed. For example, in the present embodiment, as exemplified in FIG. 2, two support holes 38 are formed on the D-seat floor brace 14A.

The cowl-to brace 12 is a reinforcement member extending in the front-and-rear direction of the vehicle. More specifically, the cowl-to brace 12 is placed to incline from the upper side toward the lower side, from the front side of the vehicle toward the rear side.

The cowl-to brace 12 has a structure in which a plurality of ribs 43 are provided (stretched around) a lightened part, and a support hole 42 (refer to FIG. 2) is formed on a front end thereof, through which a fastening member such as a bolt is inserted. The front end of the cowl-to brace 12 is fixed on a cowl panel 40 (refer to FIG. 1) placed on a farther front side than the instrument panel R/F pipe 10, via the support hole 42. In addition, stud bolts 44, 44 are embedded on a rear end of the cowl-to brace 12. The stud bolts 44, 44 are inserted into the support holes 38, 38 of the D-seat floor brace 14A, and a fastening member such as a nut is screwed thereinto, to fix the rear end of the cowl-to brace 12 and the upper end of the D-seat floor brace 14A.

Further, a joint portion 46 to be joined with the instrument panel R/F pipe 10 is formed between the front end and the rear end of the cowl-to brace 12. As will be described later, the joint portion 46 is formed in a ring shape, and is joined over the entire circumference of the instrument panel R/F pipe 10. With such a configuration, the cross-sectional shape collapse of the instrument panel R/F pipe 10 when the torsion moment is input can be suppressed.

Support Structure of Instrument Panel R/F Pipe

As exemplified in FIG. 1, the instrument panel R/F pipe 10 is supported and fixed on a vehicle body via a plurality of members. As a support structure in the width direction, respective ends of the instrument panel R/F pipe 10 are supported by front pillars 48, 48 via the side brackets 18, 18. In addition, as a support structure primarily in the front-and-rear direction of the vehicle, the instrument panel R/F pipe 10 is supported with respect to the cowl panel 40 via the cowl-to brace 12. Further, as a support structure primarily in the up-and-down direction of the vehicle, the instrument panel R/F pipe 10 is supported with respect to the floor tunnel 26 via the cowl-to brace 12 and the D-seat floor brace 14A.

As described above, the joint portion 46 of the cowl-to brace 12 has a ring shape, and, during assembly of the steering support structure, the joint portion 46 is fitted and inserted (or plugged) into the P-seat pipe 10B of the instrument panel R/F pipe 10. When the joint portion 46 (the cowl-to brace 12) is fitted and inserted into a predetermined joined location 50 of the P-seat pipe 10B, the joint portion 46 is joined with the P-seat pipe 10B (the joined location 50 thereof) over the entire circumference.

Figure 3:
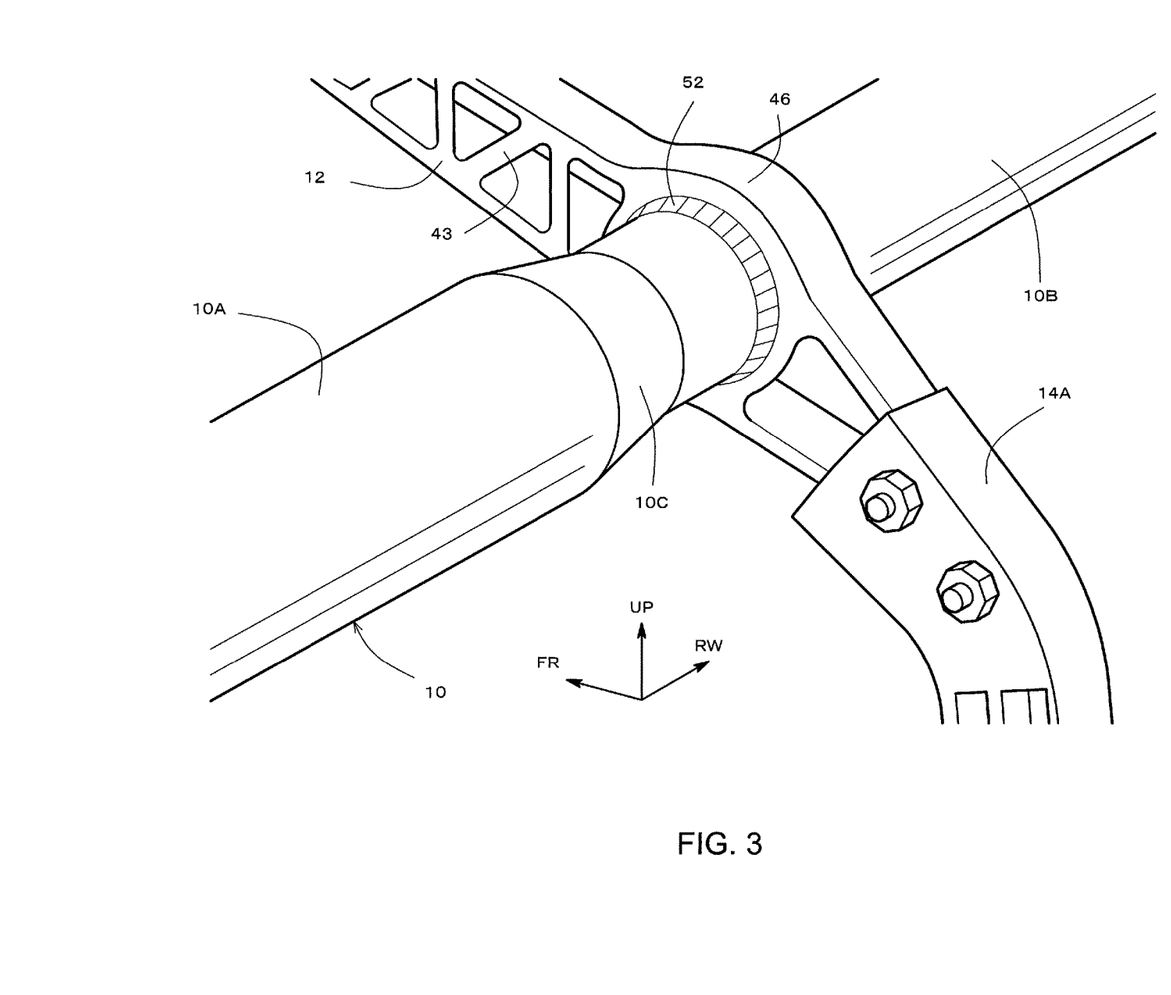
FIG. 3 is an enlarged perspective diagram of a periphery of a joint portion of a cowl-to brace.
Figure 4:
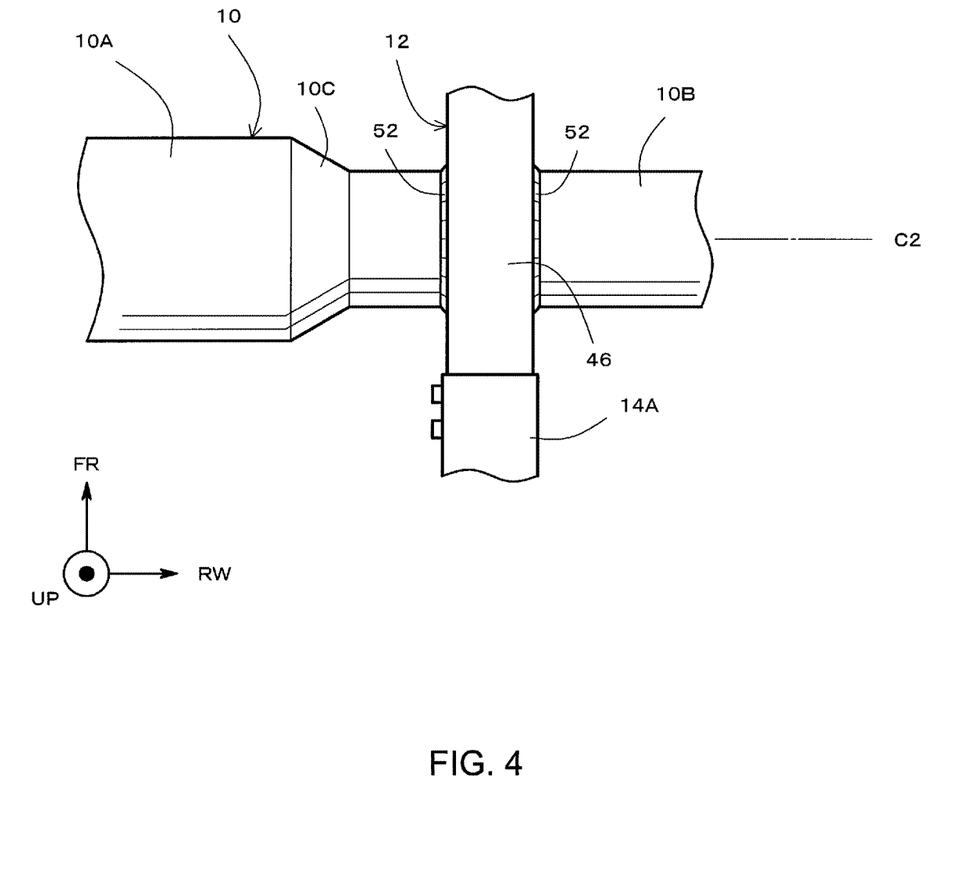
FIG. 4 is an enlarged plan view of a periphery of a joint portion of a cowl-to brace.

This joining may be executed, for example, by full-circumference welding (full-circumference fillet welding) as exemplified in FIGS. 3 and 4. A full-circumference welding portion 52 may be formed on both side surfaces of the cowl-to brace 12, as exemplified in FIG. 4. Alternatively, an outer circumferential surface of the joined location 50 of the P-seat pipe 10B and an inner circumferential surface of the joint portion 46 may be fixed over the entire circumference by an adhesive or by brazing.

Figure 5:
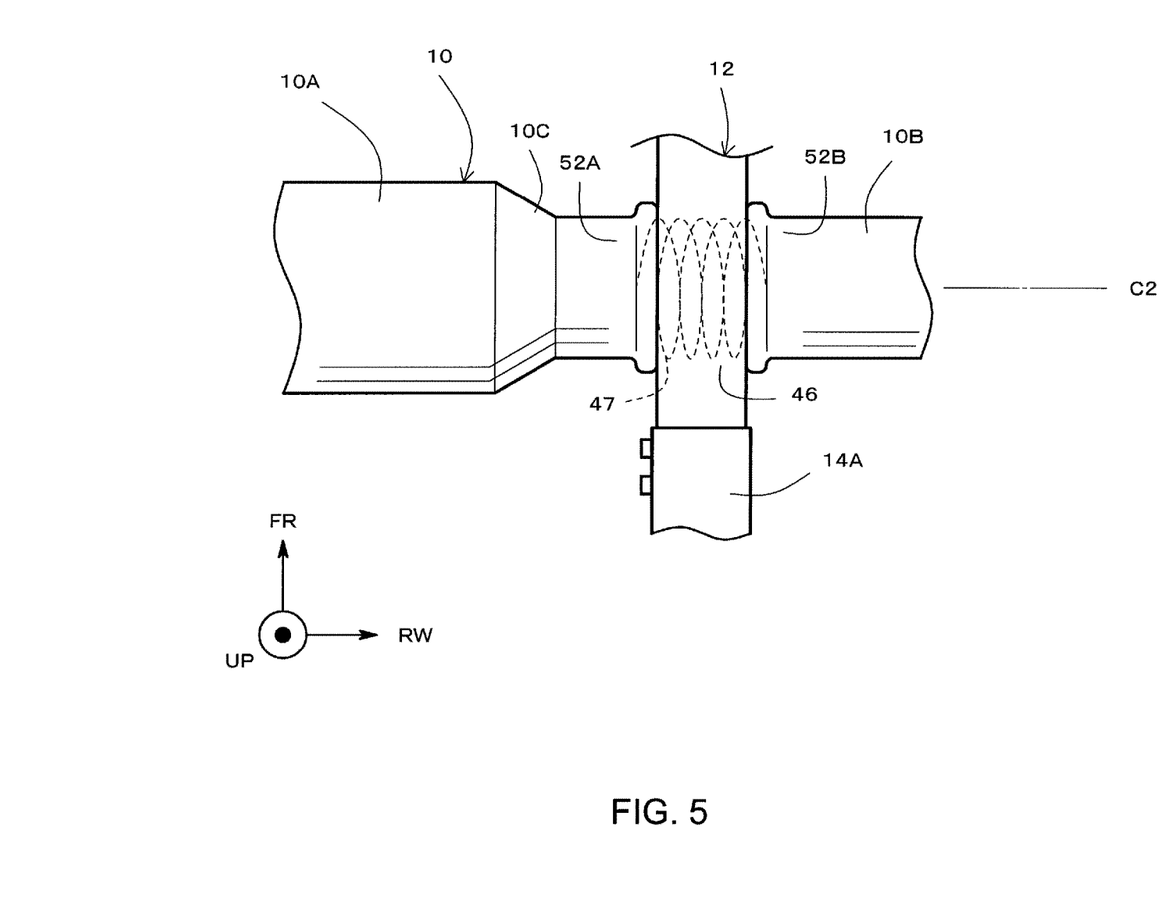
FIG. 5 is a diagram for explaining joining by electromagnetic molding.

Alternatively, as exemplified in FIG. 5, the joint portion 46 and the P-seat pipe 10B may be caulked over the entire circumference by an electromagnetic molding process. Because the electromagnetic molding process is a known art, the process will be only briefly described herein. An electromagnetic coil is inserted into a pipe member formed from a high-conductivity material such as aluminum and copper. Then, a large current of a pulse form is supplied to the electromagnetic coil, to cause a magnetic flux to be generated in the electromagnetic coil and to induce an induced current in the pipe member. In this process, a Lorentz force acts on the pipe member in which the induced current is induced toward an outer side in the radial direction, and, as a result, the pipe member is expanded.

For example, the electromagnetic molding process is executed in a state where the joint portion 46 of the cowl-to brace 12 is fitted and inserted into the P-seat pipe 10B, to the joined location 50 (refer to FIG. 2). In this process, for smooth fitting and insertion, the inner circumferential size of the joint portion 46 (a ring inner diameter) is formed slightly larger than the outer circumferential size of the P-seat pipe 10B. Then, the electromagnetic coil 47 is inserted to a position in the P-seat pipe 10B corresponding to the joined location 50. In this process, the electromagnetic coil 47 is formed such that a width of the electromagnetic coil 47 (a width in the RW axis direction) exceeds a width of the joint portion 46 (a width in the RW axis direction).

When a pulse current is supplied to the electromagnetic coil 47, a location of the P-seat pipe 10B covering the electromagnetic coil 47 is expanded (size expansion). That is, the sizes of the joined location 50 and the side portions of the joined location 50 in the width direction are expanded. In this structure, when the joint portion 46 attempts to rotate around the axis C2, a friction force acts between the joined location 50 and the inner circumferential surface of the joint portion 46 and between side surfaces of expanded portions 52A and 52B and a side surface of the joint portion 46, to thereby suppress rotation of the joint portion 46.

In addition, in the present embodiment, of a pair of the floor braces (the D-seat floor brace 14A and the P-seat floor brace 14), the D-seat floor brace 14A which is relatively closer to the steering column 16 is connected to the cowl-to brace 12. With such a configuration, a distance from a point on the instrument panel R/F pipe 10 on which the load is applied from the steering wheel 21 (a point where the center axes C1 and C2 cross in the plan view) to a joint point of the cowl-to brace 12 with the joint portion 46 is set relatively shorter, and the amount of torsion of the instrument panel R/F pipe 10 is correspondingly suppressed. With the suppression of the amount of torsion, a displacement width of the steering wheel 21 connected to the instrument panel R/F pipe 10 is also suppressed. In other words, by connecting the D-seat floor brace 14B and the cowl-to brace 12 which function as a torsion stop at a position close to the instrument panel R/F pipe 10, a high steering support rigidity can be achieved.

Behavior when Torsion Moment is Input

Figure 6:
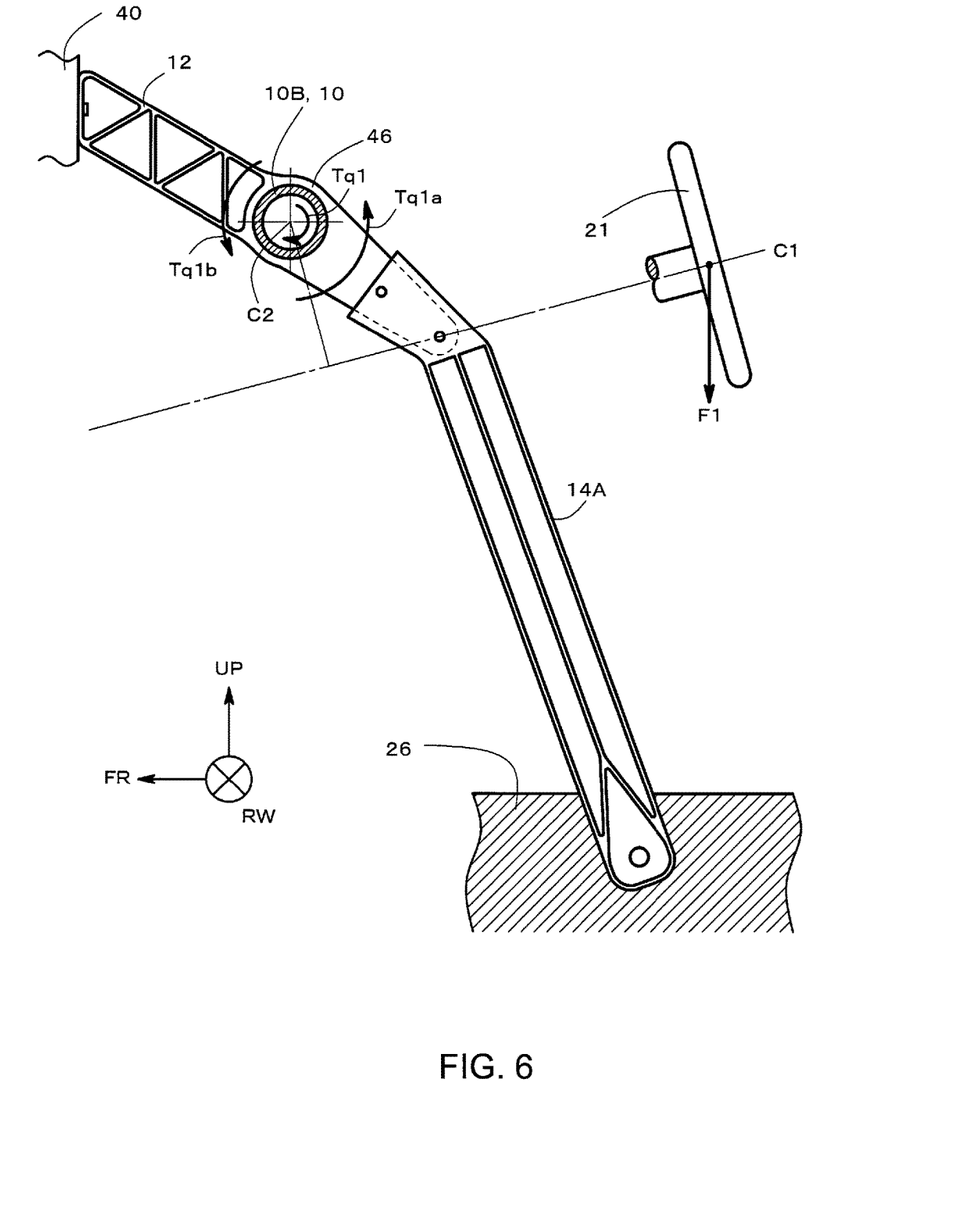
FIG. 6 is a cross sectional diagram along a line A-A of FIG. 1, for explaining a behavior of a steering support structure when a downward load is input from a steering wheel.

FIG. 6 shows a diagram for explaining behaviors of the instrument panel R/F pipe 10 and peripheral members thereof when a downward load F1 is applied to the steering wheel 21. With the input of the downward load F1, a torsion moment Tq1 is input on the instrument panel R/F pipe 10 in the clockwise direction from the center axis C2 thereof. The torsion moment Tq1 acts in a manner to compress the D-seat floor brace 14A, and, in response, a stress in the opposite direction is generated in the D-seat floor brace 14A. With this process, a torsion stress Tq1$a$ in the counterclockwise direction is caused in the instrument panel R/F pipe 10. In addition, the torsion moment Tq1 acts in a manner to pull and lift the cowl-to brace 12 in the clockwise direction, and, in response, a stress in the opposite direction is generated in the cowl-to brace 12. With this process, a torsion stress Tq1$b$ in the counterclockwise direction is generated in the instrument panel R/F pipe 10. The torsion moment Tq1 and the torsion stresses Tq1$a$ and Tq1$b$ are balanced, so that the rotation of the instrument panel R/F pipe 10 is suppressed.

Figure 7:
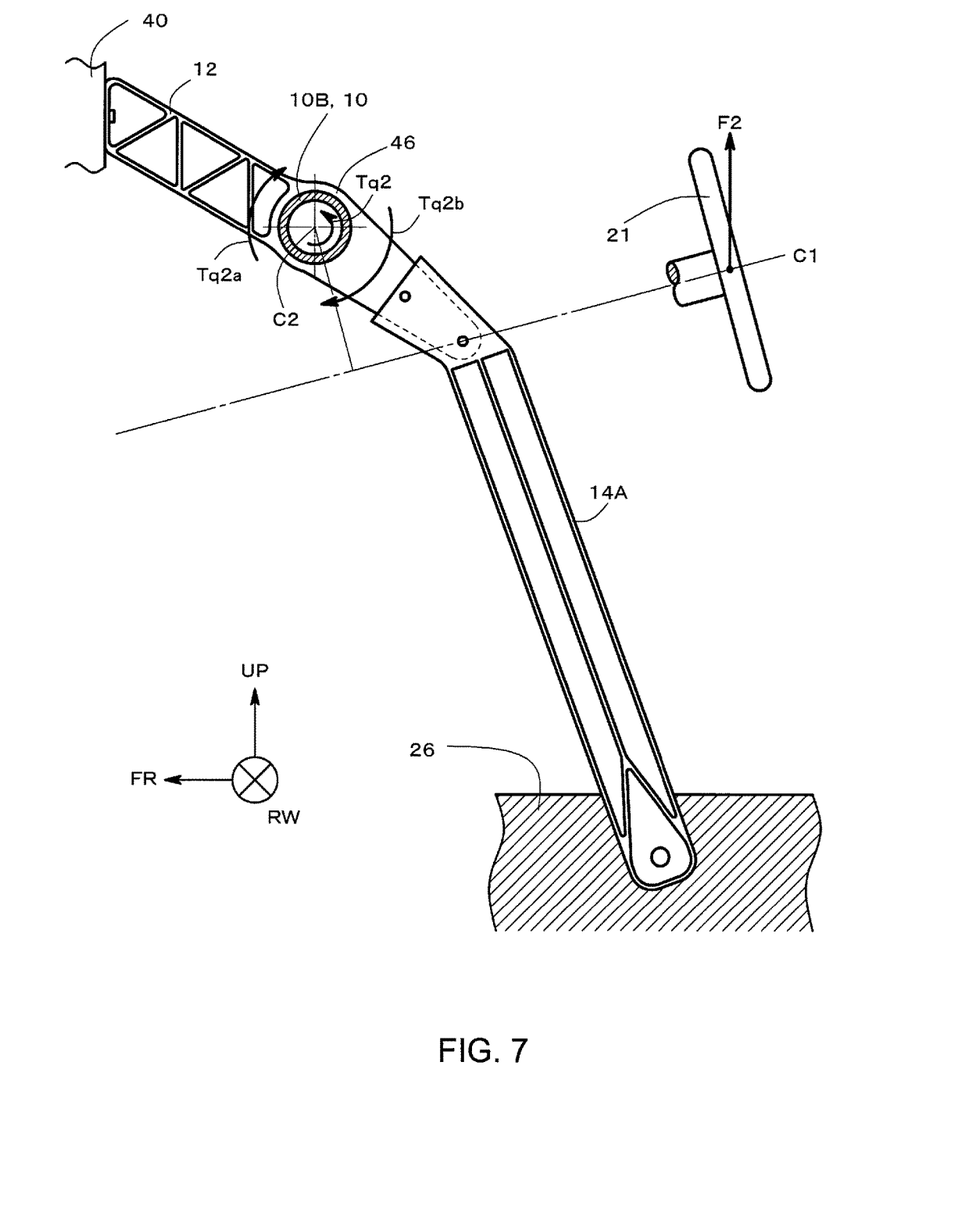
FIG. 7 is a cross sectional diagram along a line A-A of FIG. 1, for explaining a behavior of a steering support structure when an upward load is input from a steering wheel.

FIG. 7 shows behaviors of the instrument panel R/F pipe 10 and the peripheral members thereof when an upward load F2 is applied to the steering wheel 21. With the input of the load F2, a torsion moment Tq2 is input on the instrument panel R/F pipe 10 in the counterclockwise direction from the center axis C2 thereof. The torsion moment Tq2 acts in a manner to compress the cowl-to brace 12, and, in response, a stress in the opposite direction is generated in the cowl-to brace 12. With this process, a torsion stress Tq2$a$ is generated in the clockwise direction in the instrument panel R/F pipe 10. In addition, the torsion moment Tq2 acts in a manner to pull and lift the D-seat floor brace 14A in the counterclockwise direction. In response, a stress in the opposite direction is generated in the D-seat floor brace 14A, and a torsion stress Tq2$b$ is generated in the clockwise direction in the instrument panel R/F pipe 10. The torsion moment Tq2 and the torsion stresses Tq2$a$ and Tq2$b$ are balanced, so that the rotation of the instrument panel R/F pipe 10 is suppressed.

In both example configurations of FIGS. 6 and 7, because the joint portion 46 of the cowl-to brace 12 is joined with the P-seat pipe 10B over the entire circumference, the cross-sectional shape collapse of the P-seat pipe 10B can be suppressed. For example, when the P-seat pipe 10B and the joint portion 46 are full-circumference welded, the P-seat pipe 10B and the joint portion 46 are combined over the entire circumference, and deformation of the P-seat pipe 10B is stopped by the joint portion 46 to which the P-seat pipe 10B is combined.

Alternatively, when the joint portion 46 of the cowl-to brace 12 is joined with the P-seat pipe 10B by the full-circumference caulking by the electromagnetic molding as described above, a swelling deformation of the P-seat pipe 10B in the outer circumferential direction as exemplified in FIG. 12 is suppressed over the entire circumference by the joint portion 46. In addition, a friction force acts over the entire circumference between the joined location 50 and the inner circumferential surface of the joint portion 46 and between the side surfaces of expanded portions 52A and 52B and the side surface of the joint portion 46, so that the load is averaged (distributed) over the circumference, and the cross-sectional shape collapse of the P-seat pipe 10B is suppressed also by this process.

Alternative Configuration

Figure 8:
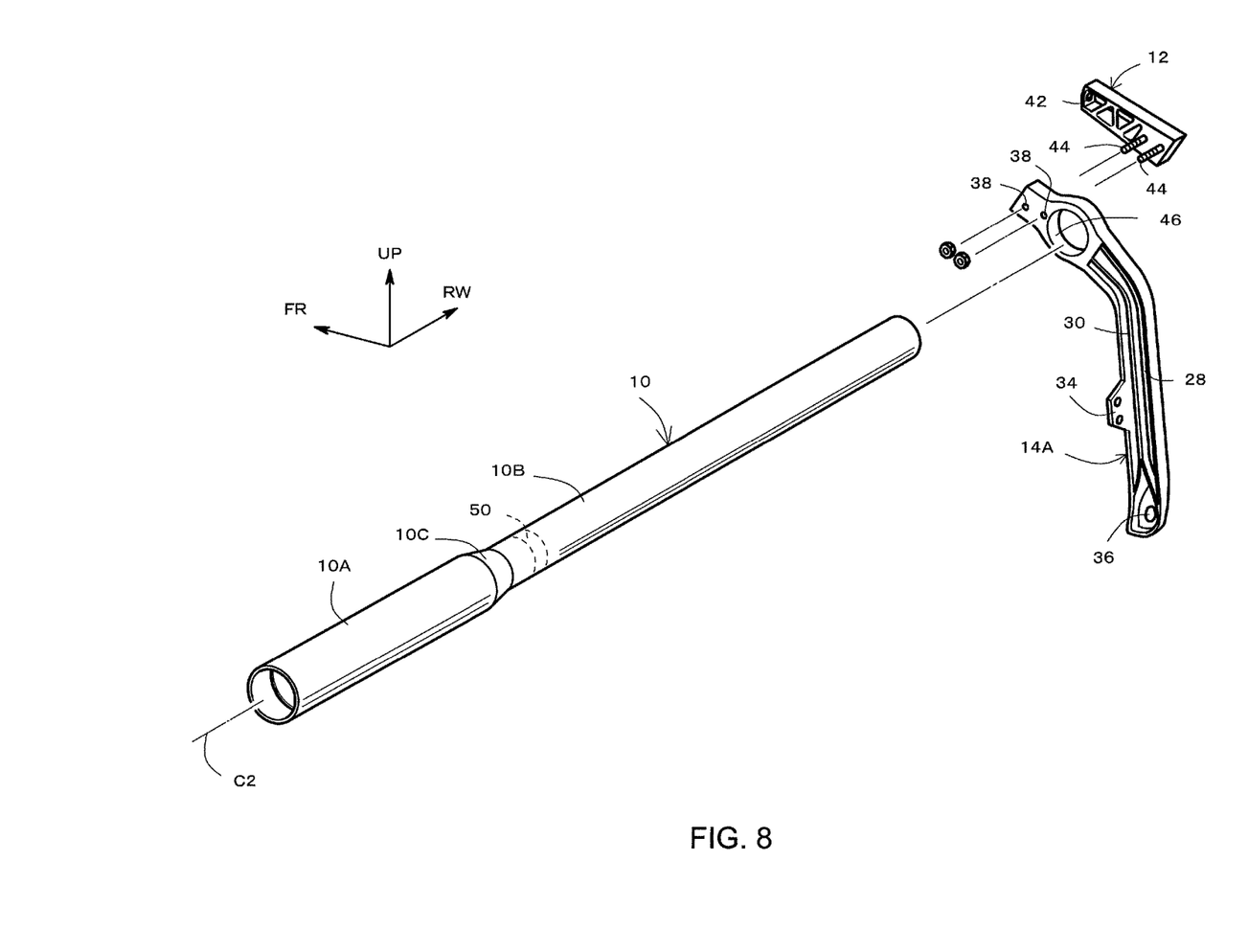
FIG. 8 is a perspective diagram exemplifying a steering support structure according to another embodiment.
Figure 9:
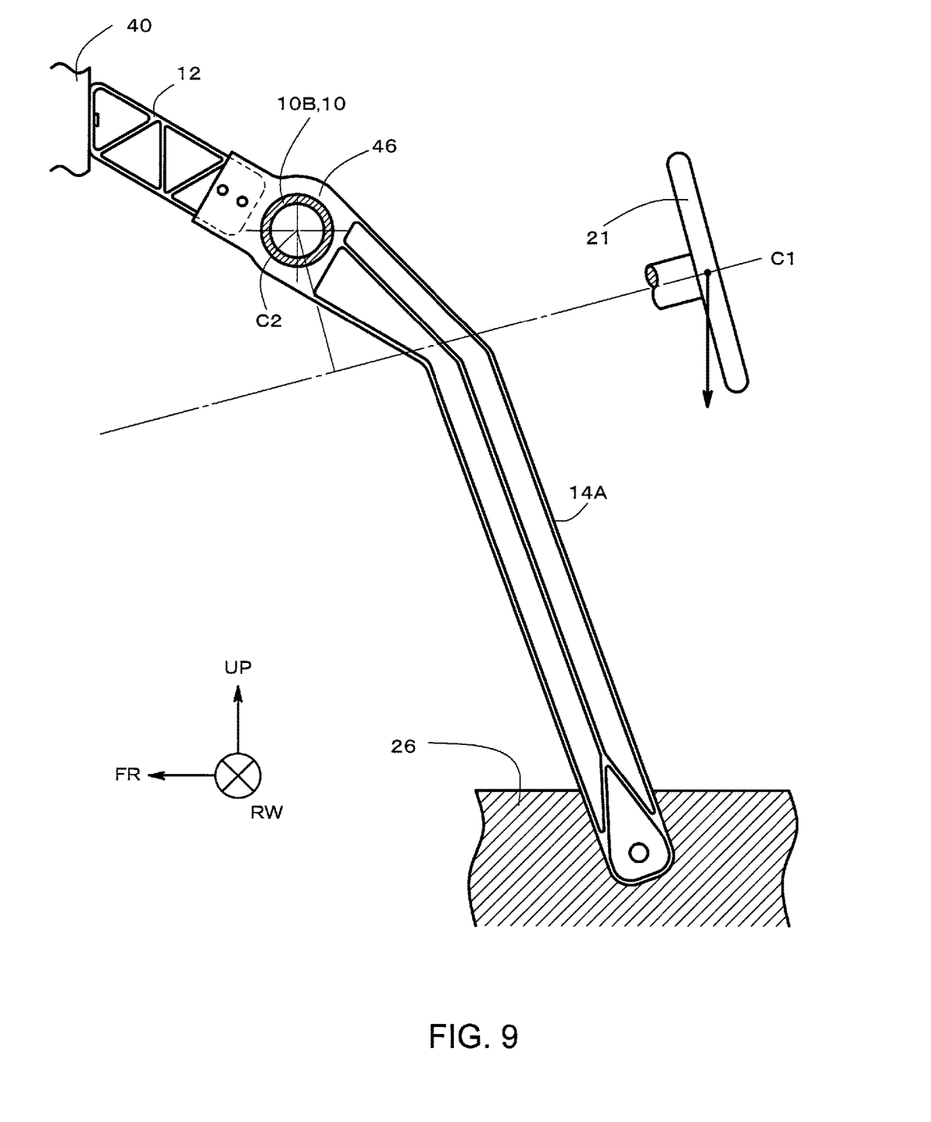
FIG. 9 is a partial side cross-sectional diagram exemplifying a steering support structure according to another embodiment.

In FIGS. 1~7, the joint portion 46 is provided on the cowl-to brace 12. However, the present disclosure is not limited to such a configuration. FIGS. 8 and 9 show an example configuration in which the joint portion 46 is provided on the D-seat floor brace 14A, in place of the cowl-to-brace 12.

The cowl-to brace 12 extends in the front-and-rear direction of the vehicle, and the front end thereof is fixed on the cowl panel 40 (refer to FIG. 1). The rear end thereof is fixed on the upper end of the D-seat floor brace 14A. More specifically, stud bolts 44, 44 are embedded at the rear end of the cowl-to brace 12. The stud bolts 44, 44 are inserted into the support holes 38, 38 at the upper end of the D-seat floor brace 14A, and a fastening member such as the nut is screwed thereinto, to fix the rear end of the cowl-to brace 12 and the upper end of the D-seat floor brace 14A.

The D-seat floor brace 14A extends in the up-and-down direction of the vehicle, and the lower end thereof is fixed on the floor tunnel 26 (refer to FIG. 1). In addition, the joint portion 46 to be joined with the instrument panel R/F pipe 10 (the P-seat pipe 10B thereof) is provided between the lower end and the upper end of the D-seat floor brace 14A.

Similar to the embodiment shown in FIGS. 1~7, the joint portion 46 of the D-seat floor braced 14A is formed in a ring shape, and is fitted and inserted into the instrument panel R/F pipe 10 (the P-seat pipe 10B thereof). The joint portion 46 and the joined location 50 of the P-seat pipe 10B are joined over the entire circumference. The joining may be the full-circumference welding, the full-circumference caulking by electromagnetic molding, etc., as described above. By the joined location 50 being joined to the joint portion 46 over the entire circumference, even when the torsion moment is input on the instrument panel R/F pipe 10, the cross-sectional shape collapse of the joined location 50 can be suppressed.

The present disclosure is not limited to the embodiment and configurations described above, and includes all changes and modifications within the scope and spirit of the present disclosure as defined in the claims.

The invention claimed is:

1. A steering support structure comprising:
    a circular tubular instrument panel reinforcement pipe that extends in a width direction of a vehicle and that supports a steering column placed in a front-and-rear direction of the vehicle;
    a cowl-to brace that extends in the front-and-rear direction of the vehicle, that has a front end fixed to a cowl panel placed in a farther front side of the vehicle than the instrument panel reinforcement pipe, and that comprises a joint portion to be joined with the instrument panel reinforcement pipe between the front end and a rear end; and
    a floor brace that extends in an up-and-down direction of the vehicle, and that has a lower end fixed on a floor tunnel and an upper end fixed to the rear end of the cowl-to brace, wherein
    the joint portion of the cowl-to brace is formed in a ring shape to be fitted and inserted into the instrument panel reinforcement pipe, and is joined over the entire circumference of the instrument panel reinforcement pipe.

2. The steering support structure according to claim 1, wherein
    the floor brace comprises a D-seat floor brace placed on a side of a driver seat, and
    an upper end of the D-seat floor brace is fixed to the rear end of the cowl-to brace.

3. A steering support structure comprising:
    a circular tubular instrument panel reinforcement pipe that extends in a width direction of a vehicle and that supports a steering column placed in a front-and-rear direction of the vehicle;
    a floor brace that extends in an up-and-down direction of the vehicle, that has a lower end fixed on a floor tunnel, and that comprises a joint portion to be joined with the instrument panel reinforcement pipe, between the lower end and an upper end; and
    a cowl-to brace that extends in the front-and-rear direction of the vehicle, and that has a front end fixed on a cowl panel placed in a farther front side of the vehicle than the instrument panel reinforcement pipe, and a rear end fixed to the upper end of the floor brace, wherein
    the joint portion of the floor brace is formed in a ring shape to be fitted and inserted into the instrument panel reinforcement pipe, and is joined over the entire circumference of the instrument panel reinforcement pipe.

4. The steering support structure according to claim 3, wherein
    the floor brace comprises a D-seat floor brace placed on a side of a driver seat, and
    an upper end of the D-seat floor brace is fixed to the rear end of the cowl-to brace.

* * * * *